(12) United States Patent
Döhring et al.

(10) Patent No.: US 10,058,886 B2
(45) Date of Patent: Aug. 28, 2018

(54) INSTALLATION AND METHOD FOR CURTAIN-COATING PANEL-SHAPED COMPONENTS

(75) Inventors: Dieter Döhring, Großenhain (DE); Hans Schäfer, Großenhain (DE)

(73) Assignee: KRONOPLUS TECHNICAL AG, Niederteufen (CH)

( * ) Notice: Subject to any disclaimer, the term of this patent is extended or adjusted under 35 U.S.C. 154(b) by 1172 days.

(21) Appl. No.: 14/351,810

(22) PCT Filed: Oct. 13, 2011

(86) PCT No.: PCT/EP2011/067846
§ 371 (c)(1),
(2), (4) Date: Jul. 24, 2014

(87) PCT Pub. No.: WO2013/053391
PCT Pub. Date: Apr. 18, 2013

(65) Prior Publication Data
US 2014/0349020 A1  Nov. 27, 2014

(51) Int. Cl.
*B05C 5/00* (2006.01)
*B05C 13/02* (2006.01)
*B05C 11/08* (2006.01)
*B05C 11/10* (2006.01)
*B65G 21/10* (2006.01)
(Continued)

(52) U.S. Cl.
CPC ............ *B05C 13/02* (2013.01); *B05B 12/004* (2013.01); *B05C 5/004* (2013.01); *B05C 5/005* (2013.01); *B05C 11/08* (2013.01); *B05C 11/1039* (2013.01); *B05D 1/305* (2013.01); *B05D 7/06* (2013.01); *B27N 7/005* (2013.01); *B65G 21/10* (2013.01); *B05C 9/12* (2013.01); *E04F 15/102* (2013.01)

(58) Field of Classification Search
CPC ....... B05B 12/004; B27N 7/005; B05C 11/08; B05C 5/004; B05C 5/005; B05D 1/305; B05D 7/06; B65G 21/10
USPC .......................................... 427/420
See application file for complete search history.

(56) References Cited

U.S. PATENT DOCUMENTS

| | | |
|---|---|---|
| 4,830,887 A | 5/1989 | Reiter |
| 5,997,691 A | 12/1999 | Gautam et al. |
| 2004/0028830 A1* | 2/2004 | Bauer ................... B05B 12/122 427/256 |

FOREIGN PATENT DOCUMENTS

| | | |
|---|---|---|
| EP | 1252937 A1 | 10/2002 |
| GB | 984 639 A | 3/1965 |

(Continued)

OTHER PUBLICATIONS

International Search Report for corresponding patent application No. PCT/EP2011/067846 dated Jun. 28, 2012.
(Continued)

*Primary Examiner* — Alexander Marion Weddle
(74) *Attorney, Agent, or Firm* — Renner, Otto, Boisselle & Sklar, LLP

(57) ABSTRACT

The present invention relates to a device 10 and a method for curtain-coating of panel-shaped components 60 as well as components which have been manufactured by such a method. The device comprises a device 40 for generating a liquid curtain 42 of coating material, an input transport device 20 and an output transport device 30, wherein the output transport device 30 and/or the input transport device 20 can be height-adjusted.

18 Claims, 7 Drawing Sheets

Figure 1:
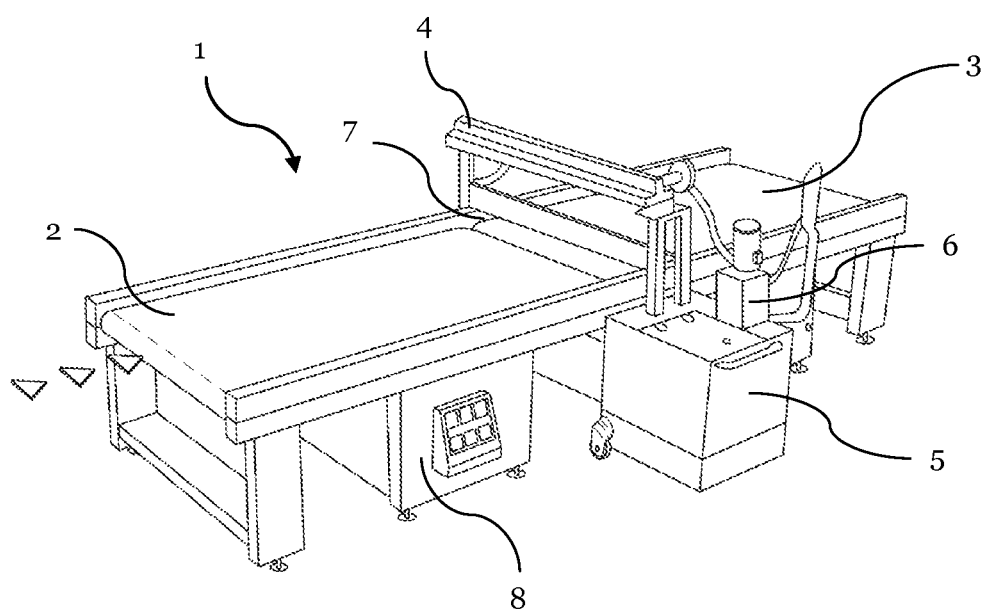

(51) Int. Cl.
  *B05B 12/00*   (2018.01)
  *B05D 1/30*    (2006.01)
  *B05D 7/06*    (2006.01)
  *B27N 7/00*    (2006.01)
  B05C 9/12          (2006.01)
  E04F 15/10         (2006.01)

(56) References Cited

FOREIGN PATENT DOCUMENTS

| GB | 984639 A | * | 3/1965 | ............ B05C 5/004 |
| GB | 984639 A | * | 3/1965 | ............ B05C 5/004 |
| RU | 2198742 C2 | | 2/2003 | |
| RU | 47261 U1 | | 8/2005 | |
| SU | 1836655 A3 | | 3/1974 | |
| UA | 12258 U | | 1/2006 | |
| WO | 2009074174 A1 | | 6/2009 | |

OTHER PUBLICATIONS

Decision to Grant for corresponding Russian Patent Application No. 2014113234/05(020728) dated Mar. 1, 2016.
Decision to Grant for corresponding Ukranian Patent Application No. a 2014 03836 dated Mar. 25, 2016.

* cited by examiner (State of the art)

INSTALLATION AND METHOD FOR CURTAIN-COATING PANEL-SHAPED COMPONENTS

1. FIELD OF THE INVENTION

The present invention relates to a device and a method for curtain-coating of panel-shaped components, like for instance MDF-panels (MDF: medium density fiber board) or HDF-panels (HDF: high density fiber board).

2. BACKGROUND OF THE INVENTION

From the prior art several devices and methods are known, in order to coat surfaces of panel-shaped components. From the WO 2009/074174 A1 of the same applicant for instance a coating device is known, wherein a liquid coating material is transferred by means of an application drum to an application belt. Then, the application belt is pressed by means of a pressure drum onto the panel-shaped components to be coated in order to transfer the liquid coating material from the coating belts to the surface of the components to be coated. Therefore, the panel-shaped components are guided via a transport belt together with the coating belts through the device. It is a disadvantage of such drum-based application methods that the transferred coating comprises a wave-shaped surface due to the curvature of the application drum, wherein it does not matter whether the coating material is dispensed directly from the drum onto the surface to be coated or indirectly via the coating belt. However, the mountains and the valleys of this wave-shaped surface are so small that surfaces, which are manufactured by that method, are commonly able to be printed with a common 3-color-print very well. However, it has been shown that this wave-shaped surface structure is disadvantageous for digital print methods. It is assumed, that the unevenness of surfaces, which are coated in that manner, even if the unevenness is very small, may possibly lead to a sub-optimal print image for the digital print due to electric potential differences.

From the prior art also coating methods are known, which work without revolving drums. In particular, so called curtain-coating methods are known, wherein a liquid curtain of coating material is generated, through which the components to be coated are guided. The curtain of liquid material may for instance leave from a dispenser and may fall down freely due to gravity. Also dispensers are known, wherein the liquid curtain is actively outputted via nozzles.

A typical representative of such a curtain-coating is for instance described in the EP 1 252 937 A1. Herein, in FIG. 1 of this document, a schematic diagram of a device for the curtain-coating is shown. The panel-shaped components are guided via an input transport device through the liquid curtain of coating material and are guided away via an output transport device. Input and output transport devices comprise herein revolving transport belts. In curtain-coating devices for the coating of discrete components, like for instance panel-shaped components, a gap has to be imperatively provided between the input transport device and the output transport device, through which the liquid curtain may fall in order to lead surplus coating material away. This is caused by the fact that during the coating of panel-shaped components unavoidably more or less large gaps exist between two succeeding components.

Contrary to that, also curtain-coating devices are known, which are designed for the coating of sheet material, like instance for the coating of paper sheets. In these devices, commonly no gap is necessary since the sheet to be coated does not comprise any interruption and is so to say "endless", when it is guided through the coating curtain.

Although the common devices and methods for the curtain-coating work sufficiently, there is still a need for improvements. It has been in particular shown that the coating of (slightly) curved panel-shaped components is problematic, since they will be coated during the guidance through the curtain at their raised areas in another way than at the relatively low areas. This comes in particular up for components, which comprise a specific flexibility, like for instance large but thin panels made of wood material. It may in particular come up that the liquid curtain of coating material breaks at an end section of a panel, which is guided through the curtain, when this end section is bent downwards. Moreover, there is the risk that the front section of a panel, which is guided through the curtain, gets a hit during the contact with the output transport device, when the front section is bent downwards. Hereby, the coating process is disturbed. These problems arise more often for relatively thin panel-shaped components, i.e. components, which comprise a large length relative to their thickness and which comprise accordingly a specific flexibility.

Based on the above mentioned prior art, the problem arises to provide a device and a method for the curtain-coating of panel-shaped components, by which the above mentioned disadvantages of the prior art may be eliminated and respectively reduced. In particular there is the problem to provide a device and a method, by which thin panel-shaped components and respectively uneven panel-shaped components may be coated in good quality with a liquid coating-curtain. In particular, a homogeneous coating of panels made of wood material may be allowed by the present invention, wherein the panels comprise a slight convex curvature over their length.

These and other problems, which are mentioned during the reading of the following description or which may be recognized by the person skilled in the art, are solved by a device for the curtain-coating according to claim 1 and by a method according to claim 14.

3. DETAILED DESCRIPTION OF THE INVENTION

In order to facilitate the understanding of the invention, in the beginning a typical device for the curtain-coating of panel-shaped components according to the prior art is explained by means of FIG. 1.

In FIG. 1, a typical device for the curtain-coating of panel-shaped components is schematically shown. The device comprises an input transport device 2 and an output transport device 3 in order to guide board-shaped components in the direction of the arrows beyond a dispenser 4. The dispenser 4 dispenses a liquid curtain of coating material, in order to provide the components to be coated with a coating. Between the input transport device 2 and the output transport device 3, a gap 7 can be seen, which is directly arranged beyond the dispenser 4. This gap 7 is imperatively necessary for all coating devices for panel-shaped components, since between the single components to be coated, like for instance MDF-panels, which are guided through the device, a gap necessarily exists. Then the surplus coating material falls through the gap 7 into a collecting container 5. A pump 6 guides the surplus coating material, which has been collected in the collecting container 5 back to the dispenser 4. Reference sign 8 relates to a control device and respectively to a corresponding drive for the transport devices.

The device according to the invention for the curtain-coating differs from the devices of the prior art in particular in that the output transport device and/or the input transport device is (and respectively are) designed adjustably in height, in order to allow during the operation of the device a relative height adaption of both transport devices. Herein, corresponding actuating means are adapted in that they carry out during the coating operation automatically a height adaption of the output transport device and respectively of the input transport device depending on the position of the components to be coated.

Actuating means may be for instance one or more hydraulic cylinders, which raise and respectively lower the transport devices. The applicants have recognized that the common devices for the curtain-coating like they are for instance shown in FIG. 1 work sufficiently, if the panel-shaped components to be coated are in general even, but often comprise deficits in the processing of components, which are not completely even, but which for instance comprise a specific curvature. This is in particular true for the processing of relatively long and thin or panel-shaped components, which comprise a slight concave or convex shape due to their own weight or due to the manufacturing method.

This problem in particular comes up during the processing of panel-shaped components made of wood material, like they are used for the manufacturing of floor panels. These components are commonly made of medium density fiber boards (MDF) or high density fiber boards (HDF) and comprise a length of more than 2 meters and a thickness of just a few millimeters. Due to the manufacturing process of MDF- and HDF-boards, such panels and respectively plates often comprise a concave and respectively convex curvature. This curvature is very small and may merely be recognized with the mere eye. However, it may effect that during the transport of such a component from the input transport device to the inlet area of the output transport device the front border of the component hits against the output transport device, wherein the coating process is disturbed. For convex panels and respectively plates, which are guided through such a device for the curtain-coating, moreover the problem comes up that if the end section of such a panel and respectively plate leaves the input transport device, the end section slightly moves downwards. Also this may lead to a disturbance of the coating process, up to a short-term break of the liquid coating-curtain at the related end section of the panel and respectively the plate.

The present invention solves these and other problems by the automatic adaption of the height of an input- and/or of an output transport device depending on the current state of the coating process. In order to avoid for instance an interruption of the coating of the end section of the component to be coated, the output transport device may be lifted slightly in an automatic manner prior to the leaving of the end section of a component to be coated from the input transport device. By doing so, the component to be coated is guided quasi in an inclined manner through the coating-curtain, which leads to improved coating results. Preferably, the actuating means of the device should be adapted in that they raise automatically at least the inlet area of the output transport device relative to the outlet area of the input transport device, which may either be carried out by a raising of the output transport device or by a lowering of the input transport device and respectively by a combination thereof. However, it has been shown that it is sufficient, if just one of the two transport devices is moved.

Moreover, the inventors have recognized that the coating problems of board-shaped components may be avoided, if the actuating means of the device are adapted in that they automatically lower the inlet area of the output transport device a little bit and/or raise the outlet area of the input transport device, before a front section of a component to be coated comes into contact with the output transport device. Hereby, it may be avoided that a hit is generated, when for instance panel-shaped components shall be coated, which comprise along to their length a convex, curved shape. This will be explained in more detail below by means of the figures.

Commonly, it is preferred that the actuating means are designed in that a height adaption is carried out during the operation of the device for every component to be coated.

The device according to the invention as well as the method according to the invention show in particular big advantages, if the panel-shaped components to be processed are relatively thin, that means if they comprise a length, which corresponds to a multitude of the thickness of the components. This is in particular true for the processing of components, wherein the ratio of the length to the thickness (L/d) is at least 150, preferably at least 190, more preferred at least 240 and even more preferred at least 280 and most preferred at least 300. For instance for the manufacturing of laminate boards commonly MDF- or HDF-panels are used, which comprise a length of about 280 cm and a width of 100 to 220 cm, but only comprise a thickness of about 6 to 10 mm. Such long and thin panels bend due to their own weight and are in addition often not completely even, but comprise over their length a slight convex curvature (and respectively a concave curvature, depending on which side of the board shows upwards). When such boards are guided in the longitudinal direction through the coating-curtain, it often happens that they hit with their front section the output transport device and a curtain-break happens, when the rear section leaves the input transport device, wherein it falls down a little bit and respectively swings.

It is in general preferred that the transport devices are longer than the largest length of the panel-shaped components, like for instance 1.3-times longer, preferably 1.5-times longer.

In general, the present invention is in particular suitable for the coating of panels made of wood material. These are for instance, but not exclusively panels made of OSB, MDF or HDF, chip boards, solid wood, veneer, parquet and ready-to-use parquet and others. The device is also suited for coating polymer-panels for instance made of PVC or made of thin compact laminates as well as mineral-bounded fiber boards.

Preferably, the panel-shaped components to be coated are transported through the device at a high speed. Therefore, the input transport devices and the output transport devices are configured in that they transport the components to be coated through the curtain at a speed of at least 50 meters per minute (m/min), preferably at a speed of at least 80 meters per minute, even more preferred at a speed of at least 100 meters per minute and mostly preferred at a speed of at least 110 meters per minute. The above mentioned coating problems come in particular up for the mentioned high transport speeds and it has been shown that the device according to the invention and respectively the method according to the invention has led in this aspect to particularly large improvements.

In general it is preferred that the panel-shaped components are guided in the longitudinal direction through the curtain. For components, which do not comprise a square shape, it is preferred that the longitudinal side should be directed as perpendicular as possible with respect to the curtain.

The actuating means should be configured in that the raising speed for the raising and the lowering of the transport devices is not too large, but also not too small. If for instance the output transport device is lowered too fast, i.e. in fall direction of the curtain, a break of the liquid curtain may occur at the surface to be coated of the component. If the output transport device is raised too fast, i.e. contrary to the fall direction of the curtain, a surplus of dispensed coating material at the related surface may occur. Thus it has been shown that the raising speeds, in particular for the raising of at least the inlet area of the output transport device should preferably be in the range of 1 cm/s to 10 cm/s, more preferred in the range of 1.5 cm/s to 7 cm/s and even more preferred in the range of 2 cm/s to 6 cm/s and most preferred in the range of 3 cm/s to 5 cm/s. This is in particular true in the context of the above mentioned transport speeds.

In the method according to the invention for the coating of panel-shaped components by means of a liquid curtain of coating material at least the inlet area of the output transport device is raised in relation to the input transport device and/or the outlet area of the input transport device in relation to the output transport device, before the end section of the component to be coated leaves the input transport device. By the phrase "inlet area of the output transport device" or "outlet area of the transport device" shall be indicated that not necessarily the entire transport device has to be raised, but that it is sufficient for the intended use, when the related section is raised.

In the preferred embodiments, the output transport device is rotatably supported at its outlet area so that a height adaption of the inlet area of the output transport device may be effected by a rotation around this bearing point.

4. DESCRIPTION OF PREFERRED EMBODIMENTS

Figure 2:
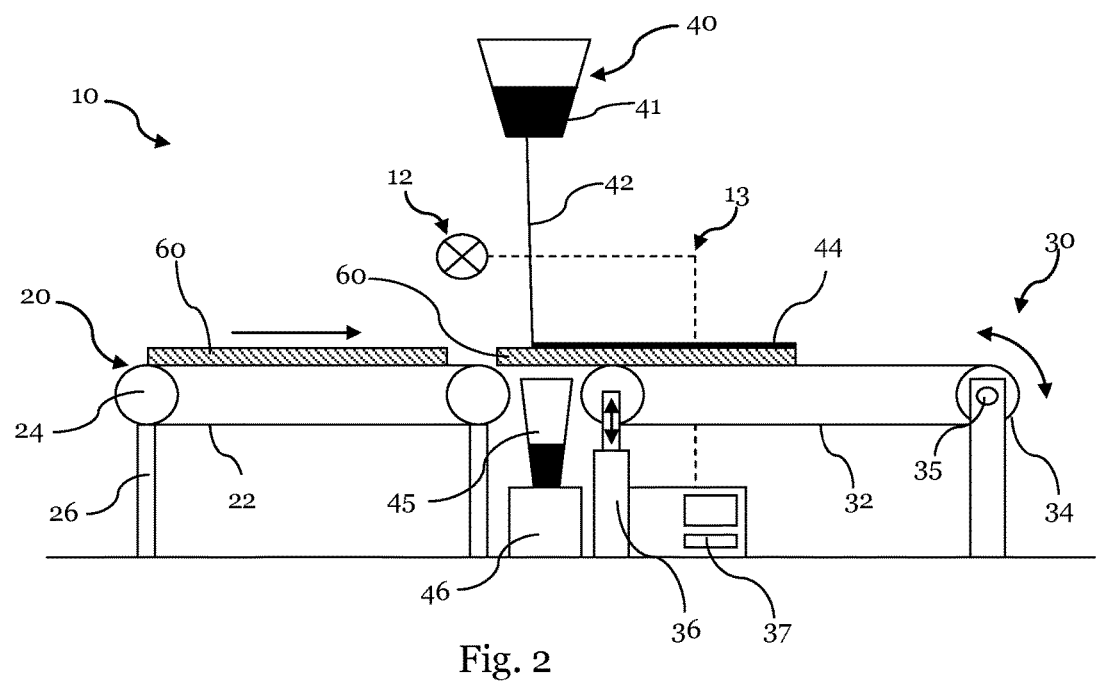
Figure 11:
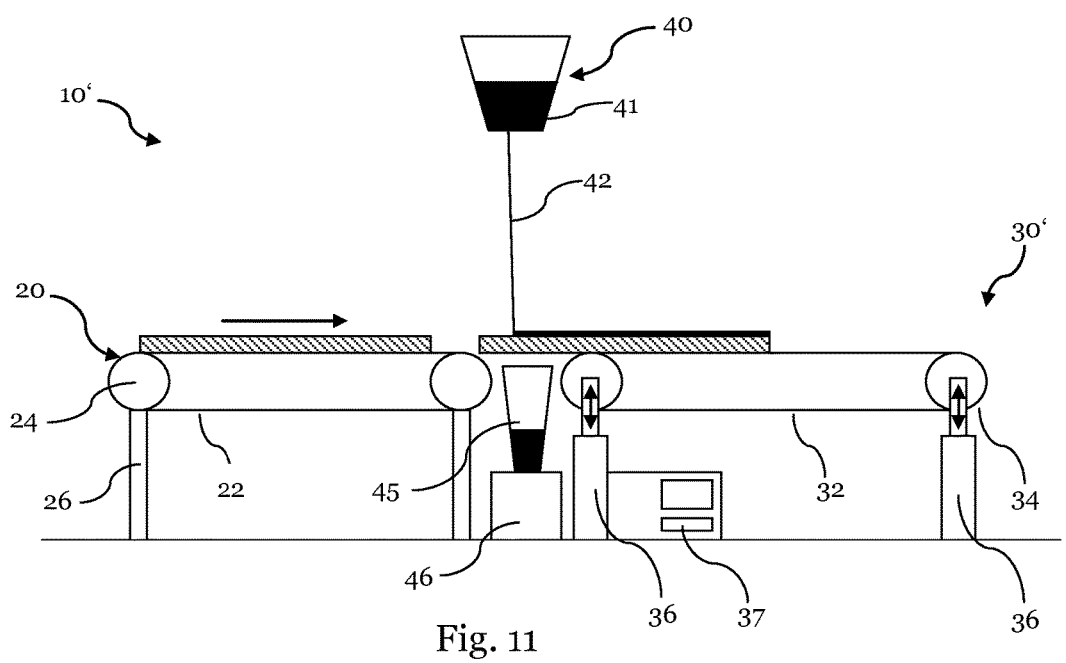
Figure 12:
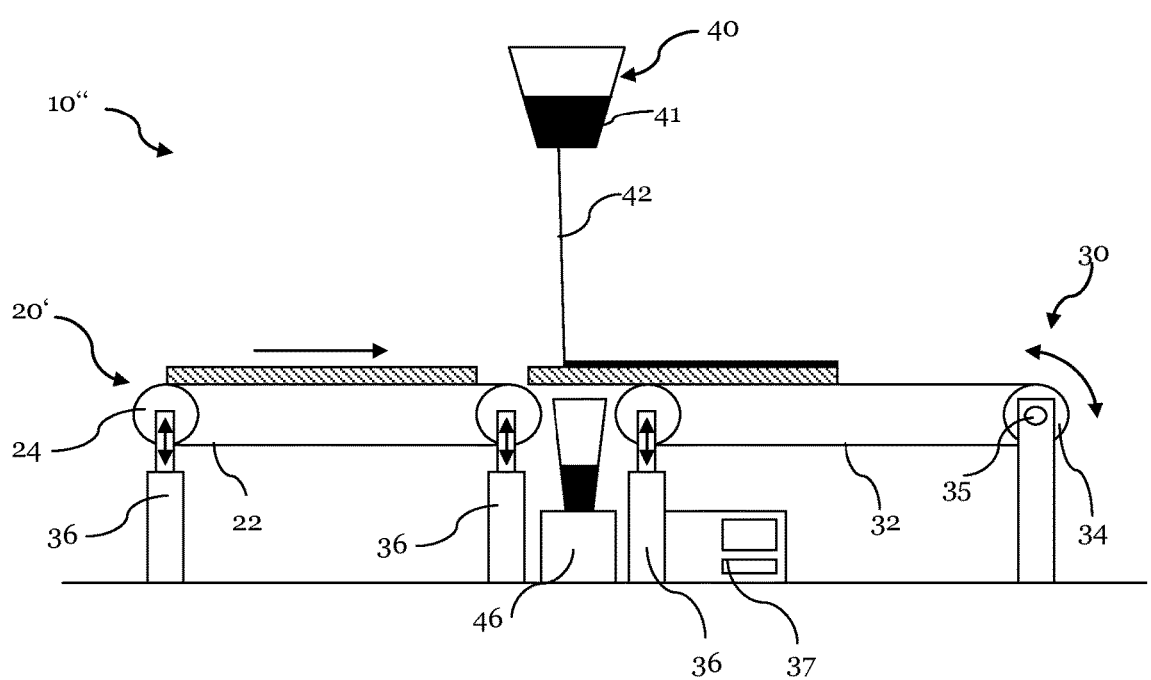

In the following, the present invention will be explained in more detail with reference to the accompanying figures. Herein shows:

FIG. 1 a curtain-coating device according to the prior art;

FIG. 2 a schematic view of a device for curtain-coating, which is improved according to the invention;

FIG. 3-10 the device of FIG. 2 in different operation conditions;

FIG. 11 a schematic view of an alternative device according to the invention; and FIG. 12 a further alternative device according to the invention.

Referring to the schematic views of FIGS. 2-12, the person skilled in the art recognizes that these Figures only show the basic components and are not true to scale. For instance the transport devices are in reality significantly longer than the components to be coated and the components to be coated are significantly thinner with respect to their length. In an existing prototype device both transport devices are each for instance more than 4 meters long and the components to be coated are boards made of wood material for the manufacturing of floorings in particular laminate floorings with a length of more than 2 meters at a thickness of just 6-10 mm. The gap between the two transport devices of the prototype is about 50 cm.

In the following, the general construction of the device according to the invention is explained in view of FIG. 2. The schematic views of the FIGS. 3-12 are mostly the same, so that during the explanation of these further figures, always just the respective differences will be mentioned.

FIG. 2 shows a preferred embodiment of a device 10 according to the invention for curtain-coating of panel-shaped components. The device 10 comprises an input transport device 20, which comprises a revolving transport belt 22, which is guided by corresponding drums 24. The input transport device 20 is arranged by means of a rigid frame 26 in a stationary manner. At the upper side of the input transport device 20 a first panel-shaped component to be coated, which is a panel and respectively a board 60, is transported in the direction of the arrow. In transport direction in front of the panel 60 a further panel 61 is located, which is already located on an output transport device 30 and is transported by it. The output transport device 30 also comprises a revolving belt 32, which is guided by drums 34. Contrary to the input transport device 20, the output transport device 30 is not rigidly fixed to a frame, but is supported at its outlet area via a hinge 35 in a rotatable manner. At the opposite side, so at the inlet area, the output transport device 30 is adapted in that its height may be adapted by means of a hydraulic cylinder 36. In a raising movement of the hydraulic cylinder 36, thus the transport belt 32 rotates in general around the hinge 35, as it is indicated by the double arrow at the hinge 35. In practice, for a length of the output transport device 30 of 4.5 meters, the raising height is just a few centimeters, for instance 5-6 cm as a maximum. In the figures, the raising movement is not true to scale, but is shown larger as it is in reality. A control unit 37 is provided, which is assigned to the hydraulic cylinder 36, wherein the control unit 37 is in communication via a data line 13 with a light barrier 12. The light barrier 12 serves as a means for the detection of the position of the components to be coated on the transport devices. The light barrier 12 detects for instance, where the front border of the panel 60 is located, so that together with the information about the transport speed the position of the panel 60 may be calculated and may be determined in relation to the further parts of the device. Alternatively, of course also other means for the detection of the position of the components to be coated are possible like for instance camera systems or laser and the like. The person skilled in the art knows from the prior art several means for the detection and supervision of the position and respectively of the way of such components to be coated so that herein a detailed explanation of such systems is omitted.

Reference sign 40 indicates a schematically shown dispenser, which is filled with a coating material 41. The coating material 41 flows downwards through a corresponding spill gap as a liquid curtain 42. The coating material may be for instance a lacquer or resin, but in particular a primer layer for an ornamental print, which is applied afterwards. The method, how the coating-curtain is generated, is not relevant for the present invention and the person skilled in the art knows several possible methods for generating such a curtain. Between the two transport devices 20 and 30 a gap is provided, which comprises in reality a length of about 50 cm. In this gap, a funnel-shaped collecting container 45 is provided, in which the liquid curtain falls, when no component to be coated is located beyond the curtain 42. The funnel-shaped collecting container 45 is connected via a pump 46 and corresponding pipes (not shown) with the dispenser 45, in order to pump the surplus coating material back into the dispenser 45. Also these parts of the device are known to the person skilled in the art for curtain-coating devices so that a more detailed explanation thereof is omitted.

Figure 3:
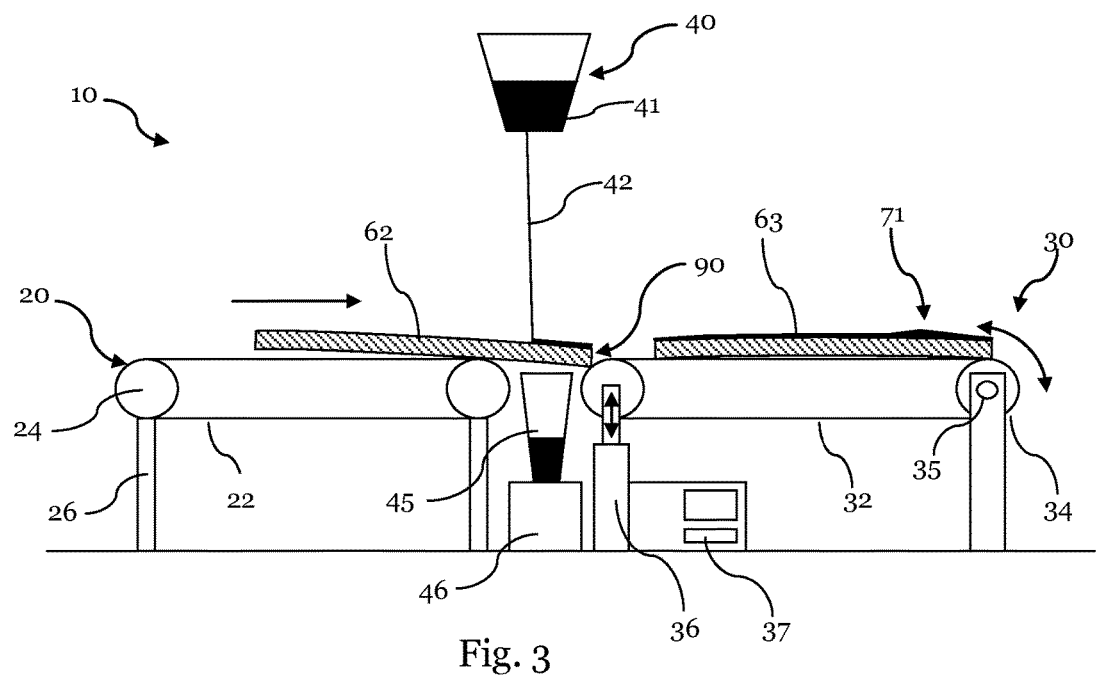

FIG. 2 shows the ideal case, wherein the panels 60, 61 to be coated do not comprise any significant curvatures and wherein they also do not bend downwards due to their own weight, when they are guided over the gap between the transport devices. However, in reality it often happens that the panels to be coated comprise a curvature along their longitudinal axis and respectively are such thin that they slightly bend downwards due to their own weight, when they leave the input transport device. This case is schematically shown in FIG. 3 (in the FIGS. 3 to 12, means 12, 13 for the detection of the position of the panels are omitted for the sake clarity). Referring to FIG. 3, it can be seen that the panels 62, 63 to be coated comprise along to their longitudinal axis a slight convex curvature. The curvature is exaggeratedly shown in the figures so that it can be recognized therein. Due to the curvature, the front border of the panel 62 hits at position 91 against the output transport device 30, wherein a slight hit is generated. This leads at the panels at a corresponding area 71 to a coating mistake.

Figure 4:
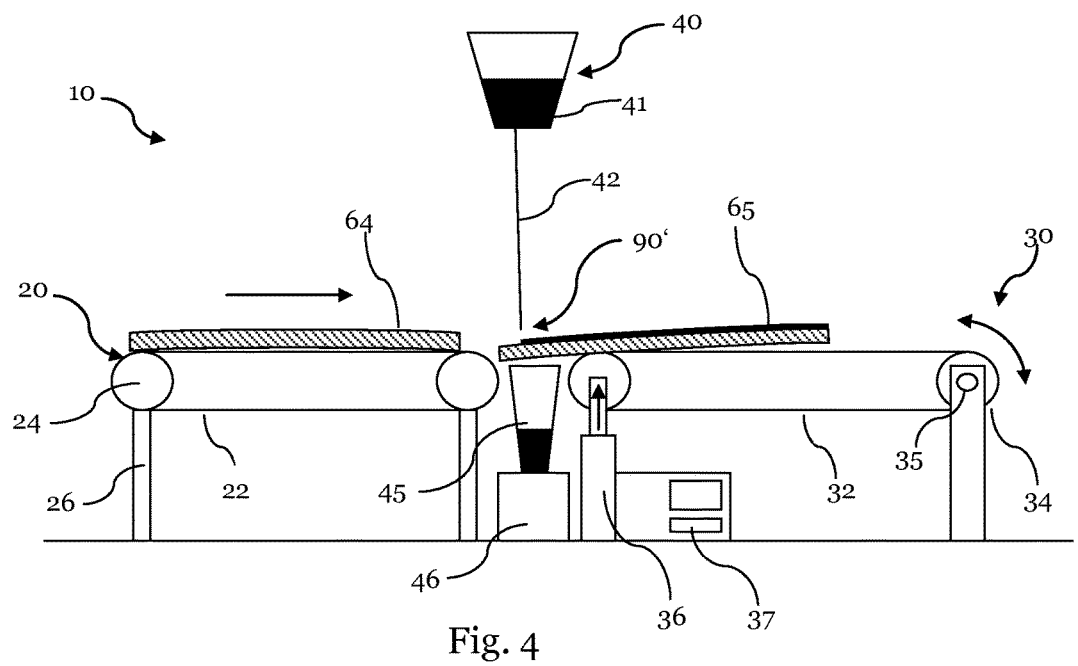
Figure 5:
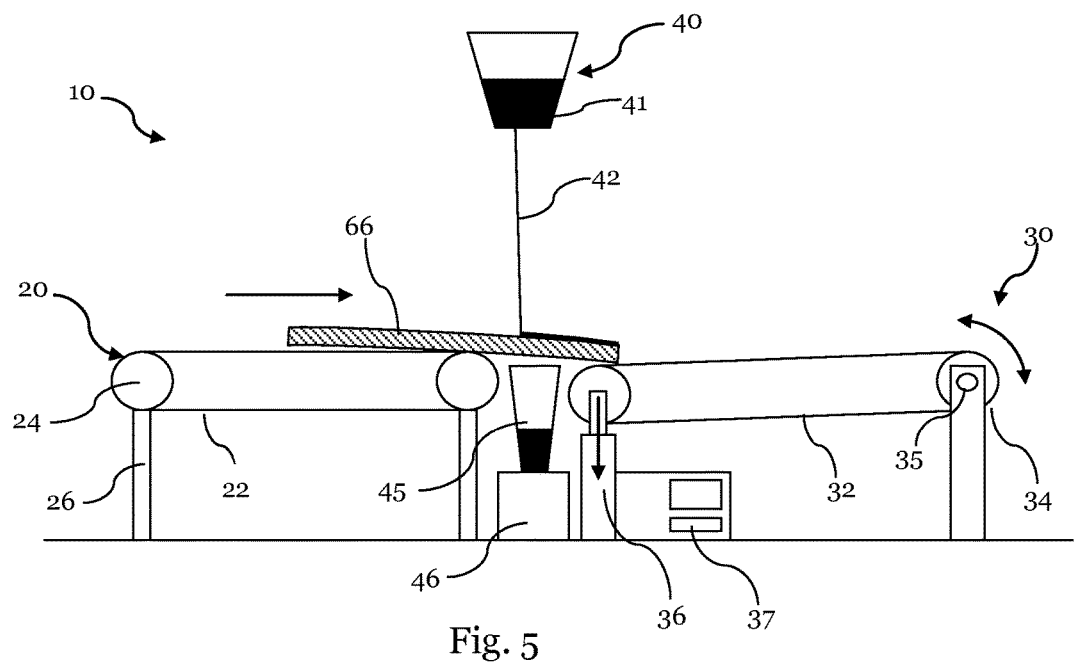

FIG. 4 shows a further example of a possible coating mistake, which may be generated by uneven panels to be coated and respectively by very thin panels. In FIG. 4 the end section of the panel 65 just has left the input transport device. Due to the curvature of the panel 65 the end section of the plate swings a little bit downwards so that a short-term curtain break occurs at the position 90' and thus a coating mistake occurs. In reality, already a swinging downwards of the end section of the panel 65 of about 1 to 2 cm is sufficient to generate a coating mistake. In the FIGS. 5-10 it is schematically shown how the coating mistakes can be avoided, which have been described above with reference to the FIGS. 3 and 4 in an exemplary manner. In FIG. 5 the output transport device 30 is lowered by means of the hydraulic cylinder in relation to the input transport device 20. According to the invention the lowering of the output transport device was already carried out before the panel 66 and respectively a front section of this panel comes into contact with the output transport device 30. By doing so, the undesired hits, which are shown in FIG. 3, may be avoided.

Figure 6:
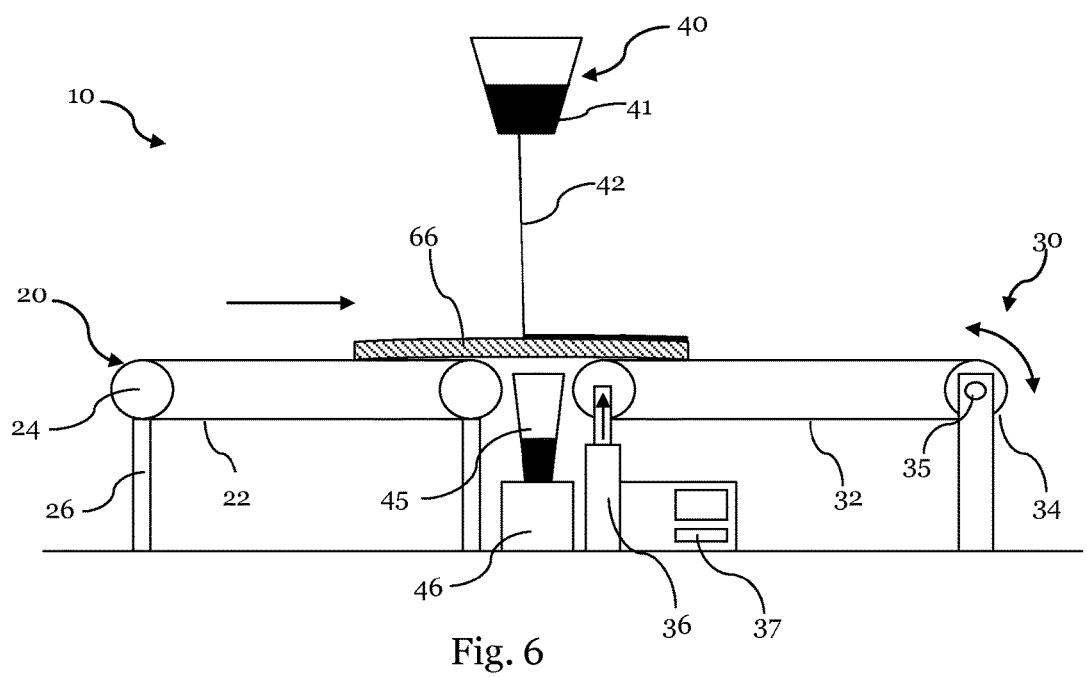
Figure 7:
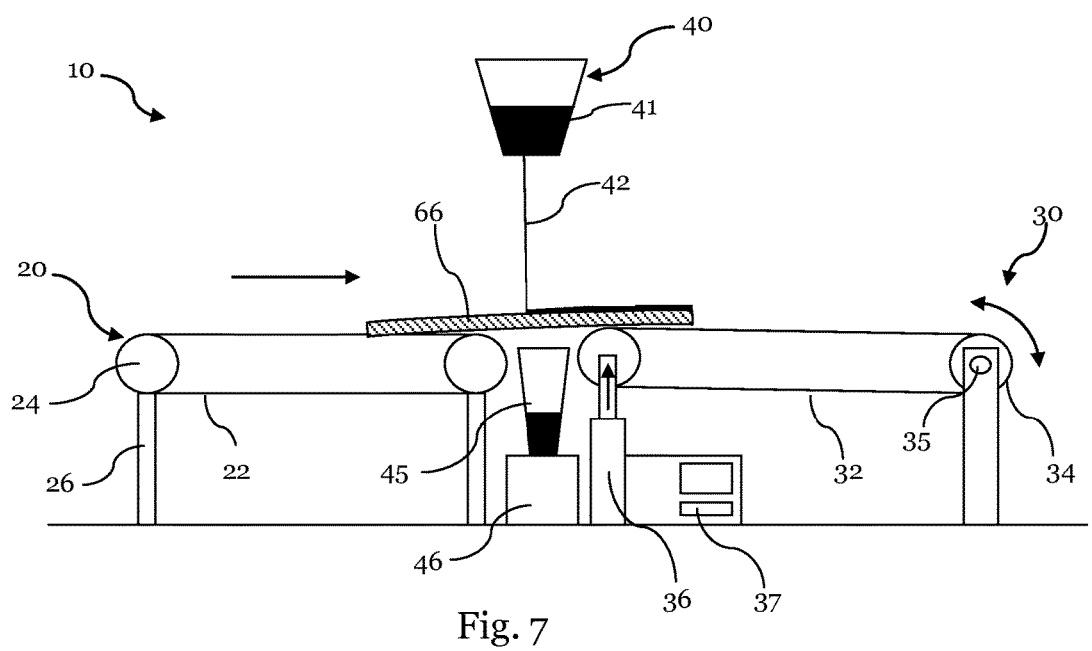
Figure 8:
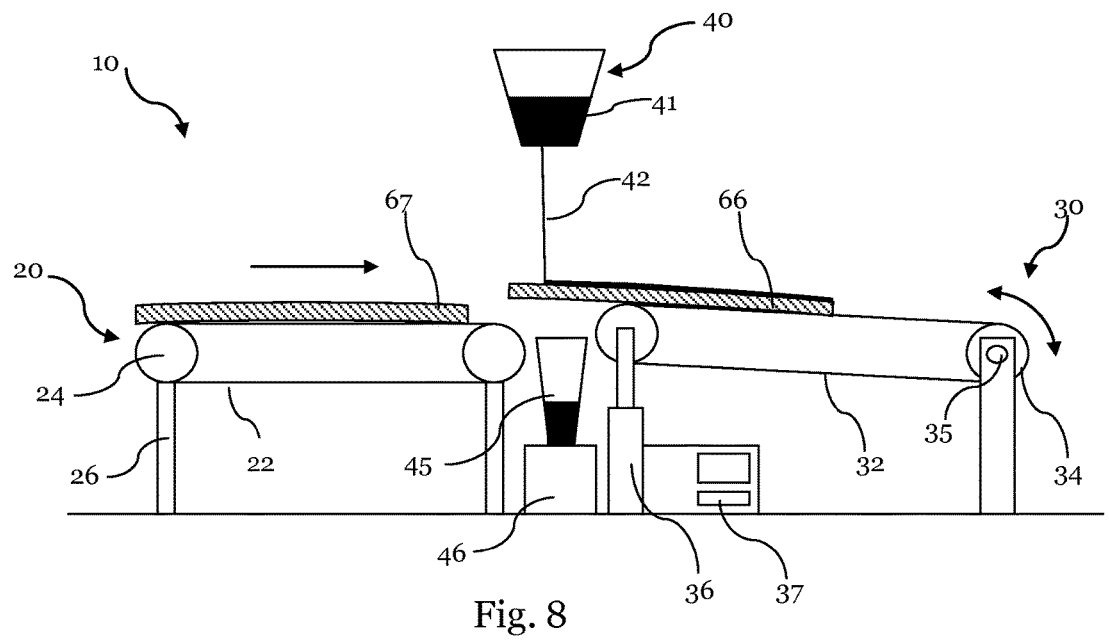

FIG. 6 shows the same panel 66, after it is transported a little bit further through the device 10. After the front section of the panel 66 came into contact with the transport belt 32 of the output transport device 30, the output transport device and respectively the inlet area thereof is again raised by the hydraulic cylinder so that the transport devices 20 and 30 are again at the same height. In FIG. 7 the panel 66 was still guided a little bit further through the device 10 and the output transport device 30 has been raised still a little bit further so that at least the inlet area of the output transport device 30 is raised to a higher level than the outlet area of the input transport device 20. The panel 66 is thus guided slightly inclined through the curtain 42, which surprisingly leads to in particular homogenous coatings, in particular for slightly curved panels. FIG. 8 shows the same panels 66, short after the end section of the panel has left the input transport device. The output transport device is shown in FIG. 8 in its highest position. The panel 66 is also guided with its end section "inclined" through the curtain 42. By doing so, the coating mistakes, which have been explained in the context of FIG. 4, may be effectively avoided. A "whipping down" of the end section of the panel as it is shown in FIG. 4 is avoided in that the panel 66 is carefully lifted by the raising movement, at least carefully in view of an uncontrolled whipping down, which occurs when the input- and output transport devices comprise the same height.

Figure 9:
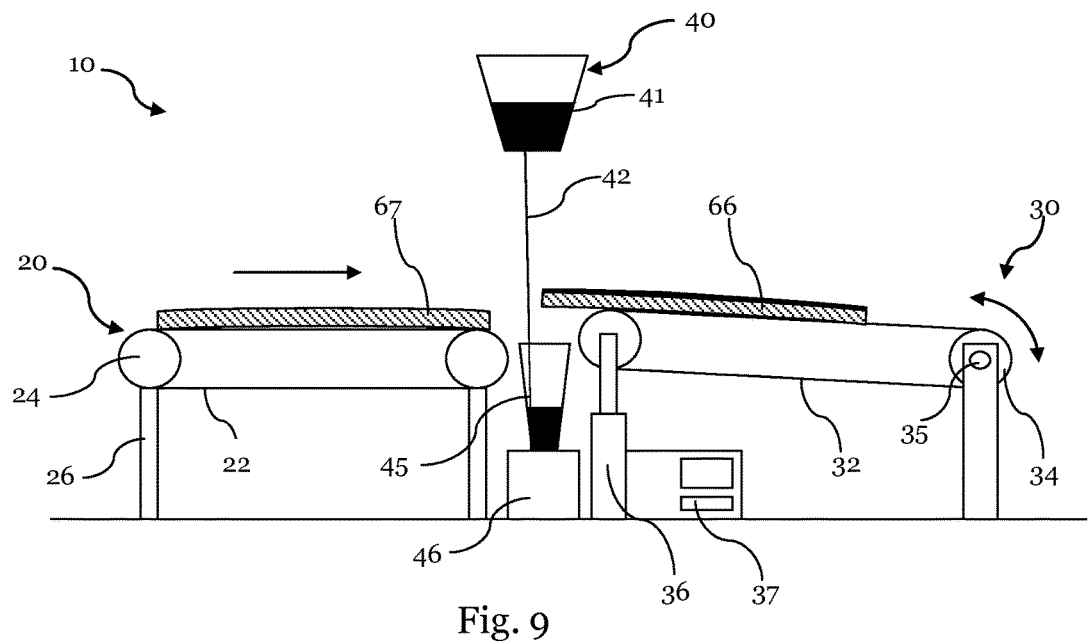

In FIG. 9, the panel 66 has left the curtain 42 and is completely coated without any mistakes. The next panel 67 is still located completely on the input transport device 20 and the curtain 42 falls into the collecting container 45 so that the surplus coating material may be pumped by means of the pump 46 again back into the dispenser. In the operating condition, which is shown in FIG. 9 (it should be mentioned that the panels 66 and 67 move with a speed of about 100 meters per minute), the actuating means (i.e. for instance the hydraulic cylinder 36 and the control unit 37) effect that the output transport device 30 is again lowered in order to receive the succeeding panel 67. It can be seen in FIG. 10 that the output transport device 30 and respectively the inlet area thereof was lowered in relation to the input transport device 20 and was adjusted to a lower level than the height of the outlet area of the input transport device 20. The panel 67 may be thus received without any hit by the transport belt 32 of the output transport device 30 and may be transported further through the device 10, as it is shown in FIG. 5.

Figure 10:
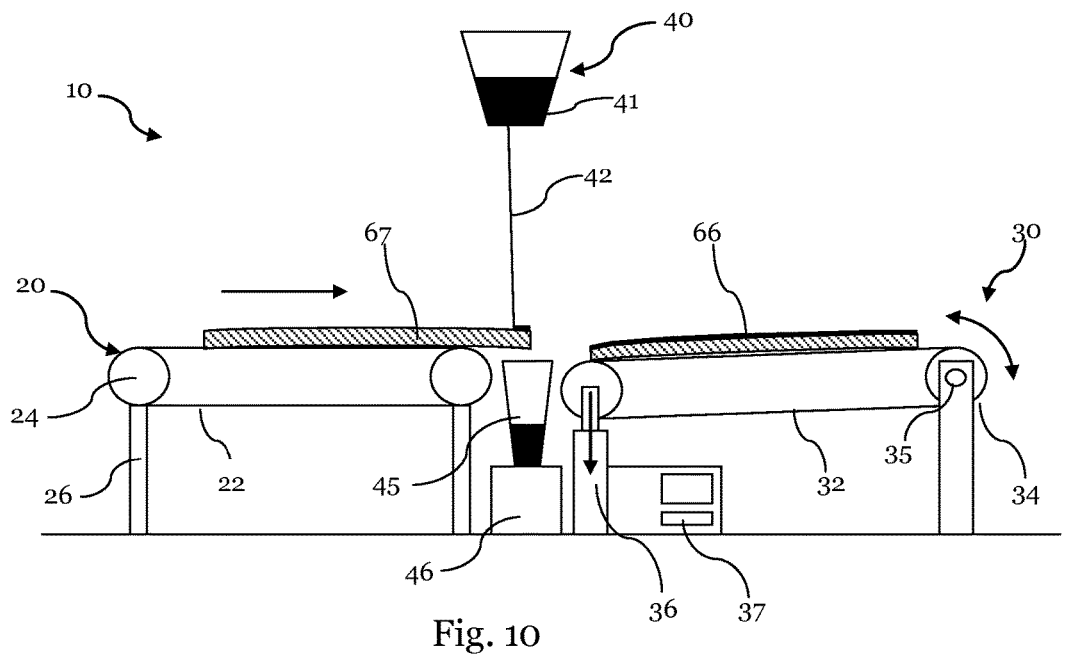

The configuration, which is shown in the FIGS. 5 and 10 of the output transport device 20 should be preferably adjusted in the beginning of the coating proceeding, i.e. before a front section of a panel to be coated and respectively a board to be coated comes into contact—and thus possibly in combination with a hit—with the output transport device.

As already explained with reference to the figures, the control of the relative vertical position of the output transport device 30 is carried out automatically depending on the position of the components to be coated, like for instance of the panels, which are shown in the figures. When the means for the detection of the position detect for instance that the front section of a component is close to the curtain, this position information is transmitted to the actuating means, which then automatically effect a lowering of the output transport device 30 to the position, which is shown in the FIGS. 5 and 10. In a similar manner an automatic raising of the output transport device 30 may be effected, if the detection of an end section of a component indicates that the component is short before it leaves the output transport device 30.

The gap between the two transport devices 20, 30 extends as it is known from the prior art perpendicularly to the transport direction of the components to be coated and the length of the gap should at least correspond to the length of the curtain so that the curtain may be completely received by the collecting container 45. It is also clear to the person skilled in the art from the schematic figures that the shown and claimed device as well as the method is not suitable to process sheet-like material like for instance paper sheets.

Due to its very homogeneous interruption-free coating by means of the curtain-coating methods according to the invention, the coated panels are suited very well to be printed with an ornament by means of a digital printer device. The device, which is described herein is thus in particular generally suitable to be used in a facility for the manufacturing of directly printed flooring panels. In such a device, for instance the shown device for the curtain-coating may be provided in front of a digital printer device, in order to print an ornament directly onto a surface of the coated components by digital print. The print images, which are generated in such manner, comprise a significantly higher quality than digital print images, which are printed onto a surface coating, which was applied by means of common drum coating methods. In FIG. 11 an alternative device 10' is shown, wherein the output transport device 30' is arranged at both ends via two (or more) hydraulic cylinders 36 in a height adjustable manner. In FIG. 12, schematically an exemplary alternative device 10" is shown, wherein the input transport device 20' is arranged by means of hydraulic cylinder 36 in a height adjustable manner. It is generally preferred that only the output transport device is arranged in a height adjustable manner and this is preferably realized by means of a hinge, as it is shown in the figures, since this effects the lowest effort in construction matters and leads to sufficient results. However, it is also conceivable, just to provide the input transport device with a corresponding height adjusting ability or both transport devices, as it is shown in FIG. 12.

The automatic height adjustability of the transport devices does not just allow the avoidance of coating mistakes due to irregular component surfaces or very thin, bending panels, but also in general allows surprisingly a more homogeneous coating due to the possibility to transport the components in an inclined manner through the coating curtain.

The invention claimed is:

1. A device for curtain-coating of a panel-shaped component, comprising:
    a device for generating a liquid curtain of coating material; and
    an input transport device and an output transport device to guide the component to be coated through the curtain, wherein a gap is provided between the input transport device and the output transport device, through which surplus coating material may be led away;
    wherein at least one of the output transport device or the input transport device is height-adjustable and the device further comprises actuating means which is adapted to carry out a relative height-adaption of at least one of the input transport device and the output transport device automatically during the coating operation depending on a position of the component to be coated,
    wherein the actuating means is adapted to carry out at least one of raising an inlet area of the output transport device, or lowering an outlet area of the input transport device before an end section of the component to be coated leaves the input transport device, and
    wherein the actuating means is adapted to automatically adjust the inlet area of the output transport device at a higher level than the outlet area of the input transport device.

2. The device for curtain-coating according to claim 1, wherein the actuating means is adapted to automatically carry out at least one of lowering the inlet area of the output transport device, or raising the outlet area of the input transport device before a front section of the component to be coated comes into contact with the output transport device.

3. The device for curtain-coating according to claim 2, wherein the actuating means is adapted to automatically adjust the inlet area of the output transport device at a lower level than the outlet area of the input transport device.

4. The device for curtain-coating according to claim 1, wherein the device includes at least one of:
    the output transport device being rotatably supported at an outlet area order to effect a height adaption of at least the inlet area of the output transport device by rotation, or
    the input transport device being rotatably supported at an inlet area in order to effect a height adaption of at least the outlet area of the input transport device by rotation.

5. The device for curtain-coating according to claim 1, in combination with a plurality of panel-shaped components, wherein the panel-shaped components are rectangular and comprise a length which corresponds to a multitude of a thickness of the components, wherein the ratio of the length to the thickness (L/d) is at least 150.

6. The device for curtain-coating according to claim 5, wherein the ratio of the length to the thickness (L/d) is at least 240.

7. The device for curtain-coating according to claim 5, wherein the ratio of the length to the thickness (L/d) is at least 300.

8. The device for curtain-coating according to claim 1, wherein the input transport device and the output transport device are adapted to transport the panel-shaped components to be coated with a speed of at least 50 m/min through the curtain during operation of the device.

9. The device for curtain-coating according to claim 8, wherein the input transport device and the output transport device are adapted to transport the panel-shaped components to be coated with a speed of at least 100 m/m in during operation of the device.

10. The device for curtain-coating according to claim 8, wherein the input transport device and the output transport device are adapted to transport the panel-shaped components to be coated with a speed of at least 110 m/min during operation of the device.

11. The device for curtain-coating according to claim 1, wherein a raising speed of the actuating means during the raising is in the range of 1 cm/s to 10 cm/s.

12. The device for curtain-coating according to claim 11, wherein the raising speed of the actuating means is in the range of 1.5 cm/s to 7 cm/s.

13. The device for curtain-coating according to claim 11, wherein the raising speed of the actuating means is in the range of 2 cm/s to 6 cm/s.

14. The device for curtain-coating according to claim 11, wherein the raising speed of the actuating means is in the range of 3 cm/s to 5 cm/s.

15. The device for curtain-coating according to claim 1, wherein the input transport device and the output transport device comprise transport belts.

16. The device for curtain-coating according to claim 1, wherein the device further comprises means for the detection of the position of the components to be coated on the transport devices.

17. The device for curtain-coating according to claim 16, wherein the means for the detection of the position of the components to be coated is in communication with the actuating means.

18. The device for curtain-coating according to claim 1, wherein the device for generating a liquid curtain of coating material comprises a dispenser which generates the free-falling curtain.

* * * * *